United States Patent
Buzzard et al.

(10) Patent No.: US 9,758,188 B1
(45) Date of Patent: Sep. 12, 2017

(54) STEERING COLUMN ASSEMBLY

(71) Applicant: Steering Solutions IP Holding Corporation, Saginaw, MI (US)

(72) Inventors: Donald A. Buzzard, Saginaw, MI (US); Michael P. Anspaugh, Bay City, MI (US); Ravi Ravindra, Saginaw, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 15/225,291

(22) Filed: Aug. 1, 2016

(51) Int. Cl.
*B62D 1/184* (2006.01)
*B62D 1/187* (2006.01)

(52) U.S. Cl.
CPC .............. *B62D 1/184* (2013.01); *B62D 1/187* (2013.01)

(58) Field of Classification Search
CPC ................................ B62D 1/184; B62D 1/187
See application file for complete search history.

(56) References Cited

U.S. PATENT DOCUMENTS

| | | | | |
|---|---|---|---|---|
| 7,267,025 B2 * | 9/2007 | Ko | ........................... | B62D 1/184 74/493 |
| 8,826,767 B2 * | 9/2014 | Maniwa | .................. | B62D 1/184 280/775 |
| 8,869,647 B2 * | 10/2014 | Hirooka | .................. | B62D 1/184 280/775 |
| 9,522,693 B2 * | 12/2016 | Tomaru | .................... | B62D 1/184 |
| 2005/0178231 A1 * | 8/2005 | Schick | .................... | B62D 1/184 74/493 |
| 2008/0053264 A1 * | 3/2008 | Matsui | .................... | B62D 1/184 74/493 |
| 2015/0375770 A1 * | 12/2015 | Buzzard | ................. | B62D 1/184 74/493 |

* cited by examiner

*Primary Examiner* — Faye M Fleming
(74) *Attorney, Agent, or Firm* — Cantor Colburn LLP

(57) ABSTRACT

A steering column assembly includes a jacket assembly connected to a support bracket and a locking assembly. The locking assembly has a first cam member, a second cam member, and a lever. The first cam member is connected to the support bracket and has a first locking pattern. The second cam member has a second cam member body that extends between a second cam member body first end and a second cam member body second end. The second cam member body second end defines a second locking pattern configured to selectively engage the first locking pattern. The lever is disposed about the second cam member body.

20 Claims, 4 Drawing Sheets

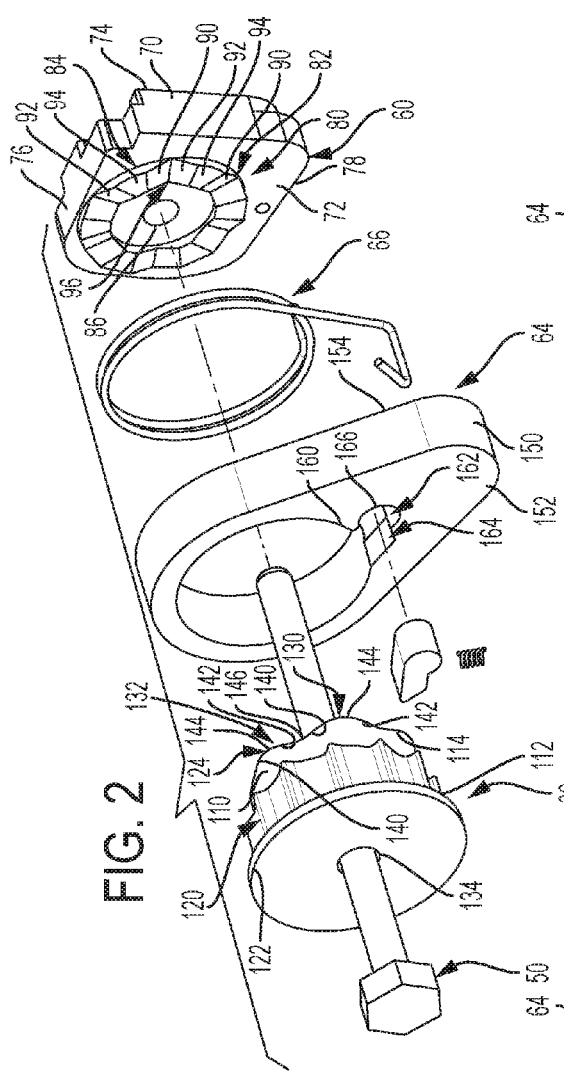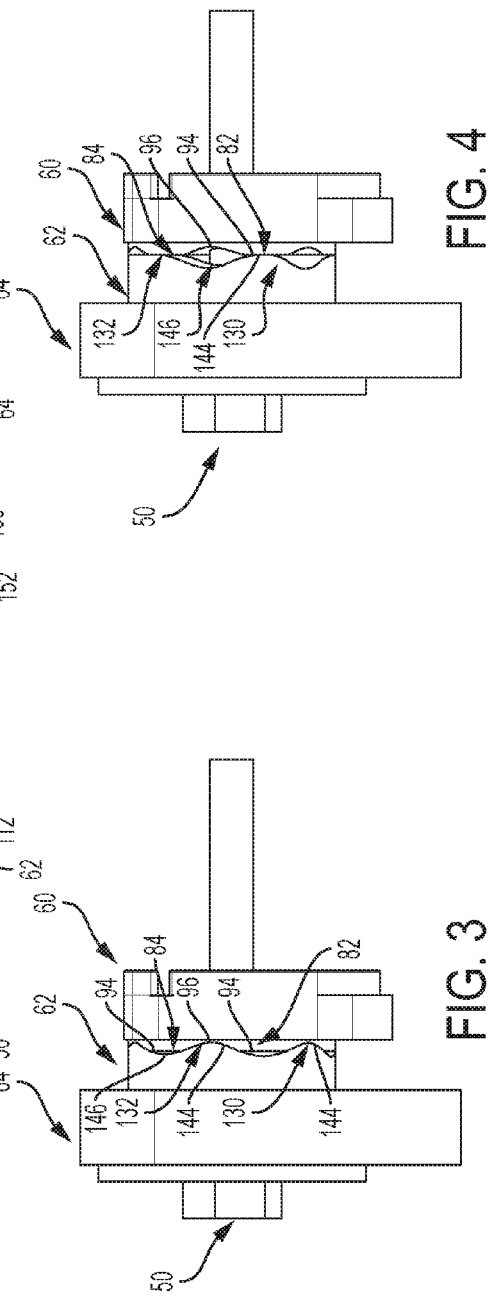

STEERING COLUMN ASSEMBLY

BACKGROUND OF THE INVENTION

Steering column assemblies are commonly provided with an adjustment mechanism that enables the steering column assembly to be adjusted either telescopically or pitched relative to an operator of the vehicle. Such a steering column assembly employs a locking mechanism to maintain and adjust the position of the steering column assembly. The locking mechanism may employ friction plates are locking teeth arrange along a raking and telescoping range of motion of the steering column.

SUMMARY OF THE INVENTION

According to an embodiment of the present disclosure a steering column assembly is provided. The steering column assembly includes a jacket assembly connected to a support bracket and a locking assembly. The locking assembly is movable between a lock position and an unlock position. The locking assembly has a first cam member, a second cam member, and a lever. The first cam member is connected to the support bracket and has a first locking pattern. The second cam member is rotatable relative to the first cam member. The second cam member has a second cam member body that extends between a second cam member body first end and a second cam member body second end. The second cam member body second end defines a second locking pattern configured to selectively engage the first locking pattern. The lever is disposed about the second cam member body and is movable between a first position and a second position.

According to another embodiment of the present disclosure a steering column assembly is provided. The steering column assembly includes a locking assembly that is movable between a lock position and an unlock position. The locking assembly includes a first cam member, a second cam member, a rolling element, and a lever. The first cam member is connected to a support bracket and has a first locking pattern. The second cam member is rotatable relative to the first cam member. The second cam member has a second cam member body that extends between a first face and a second face. The first face faces towards the first locking pattern of the first cam member. The second cam member body defines a pocket that extends from the first face towards the second face. The rolling element is received within the pocket and is configured to ride along the first locking pattern. The lever defines an opening that at least partially receives the second cam member. The lever is movable between a first position and a second position.

These and other advantages and features will become more apparent from the following description taken in conjunction with the drawings.

BRIEF DESCRIPTION OF THE DRAWINGS

The subject matter of the present disclosure is particularly pointed out and distinctly claimed in the claims at the conclusion of the specification. The foregoing and other features, and advantages of the present disclosure are apparent from the following detailed description taken in conjunction with the accompanying drawings in which:

FIG. 2 is a disassembled view of the locking assembly;

FIG. 3 is a perspective view of the locking assembly in a lock position;

FIG. 4 is a perspective view of the locking assembly in an unlock position;

DETAILED DESCRIPTION

Referring now to the Figures, where the present disclosure will be described with reference to specific embodiments, without limiting same, it is to be understood that the disclosed embodiments are merely illustrative of the present disclosure that may be embodied in various and alternative forms. Various elements of the disclosed embodiments may be combined or omitted to form further embodiments of the present disclosure. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
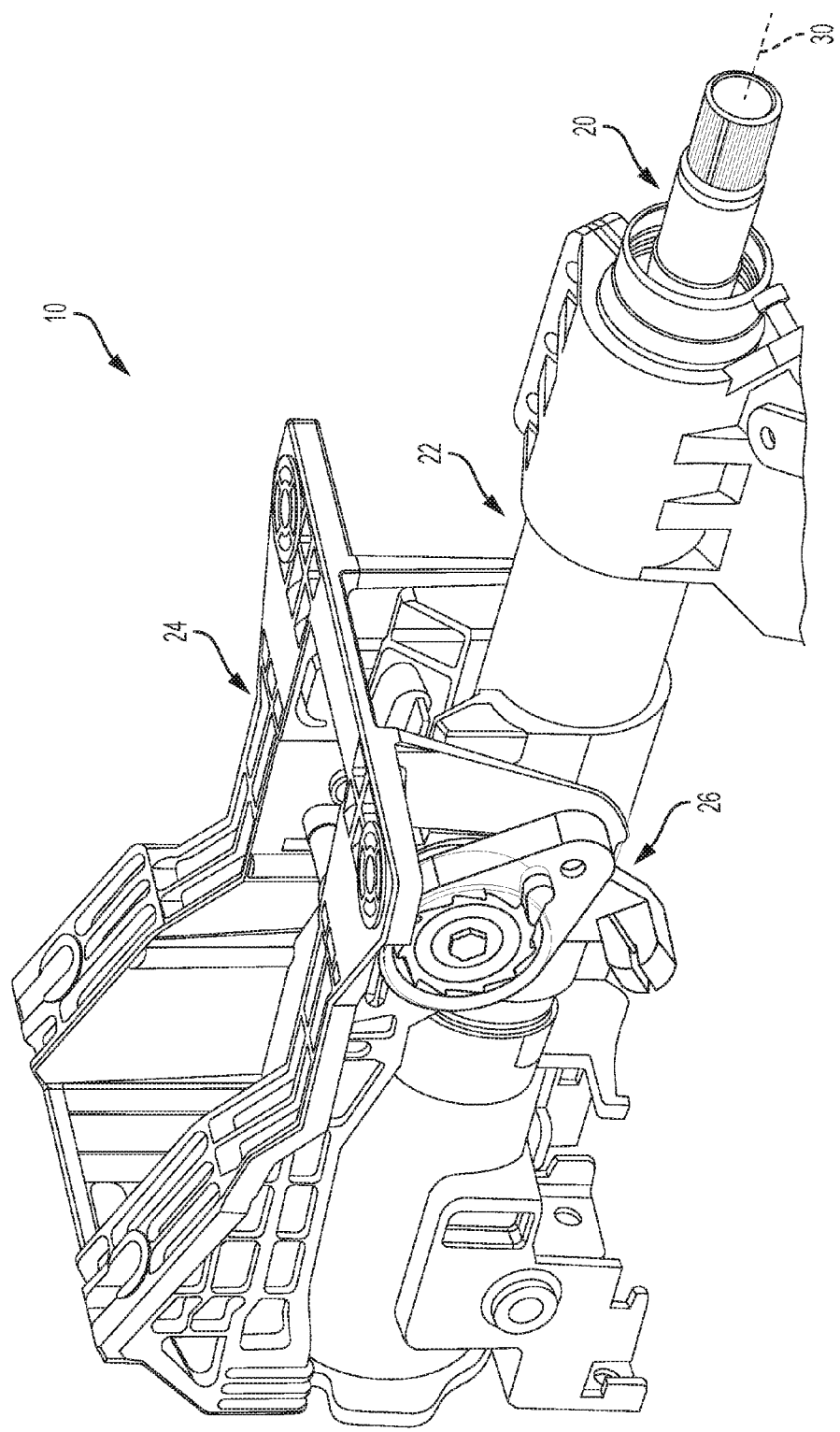
FIG. 1 is a perspective view of a steering column assembly having a locking assembly.

Referring to FIG. 1, a steering column assembly 10 is shown. The steering column assembly 10 may be an adjustable steering column assembly configured for telescoping and rake adjustments relative to an operator of a vehicle. The steering column assembly 10 includes a steering shaft 20, a jacket assembly 22, a support bracket 24, and a locking assembly 26.

The steering shaft 20 extends along a steering axis 30. The steering shaft 20 extends at least partially through the jacket assembly 22 along the steering axis 30. A steering wheel is configured to attach to an end of the steering shaft 20. A rotational or other input applied to the steering wheel rotates or pivots the steering shaft 20 about the steering axis 30 to control a vehicle wheel via a steering system.

The jacket assembly 22 is configured to carry or rotatably support the steering shaft 20. The jacket assembly 22 is extendable or retractable and/or pivot adjustable along the steering axis 30 to adjust a position of the steering wheel coupled to the jacket assembly 22 relative to an operator of the vehicle.

Figure 6:
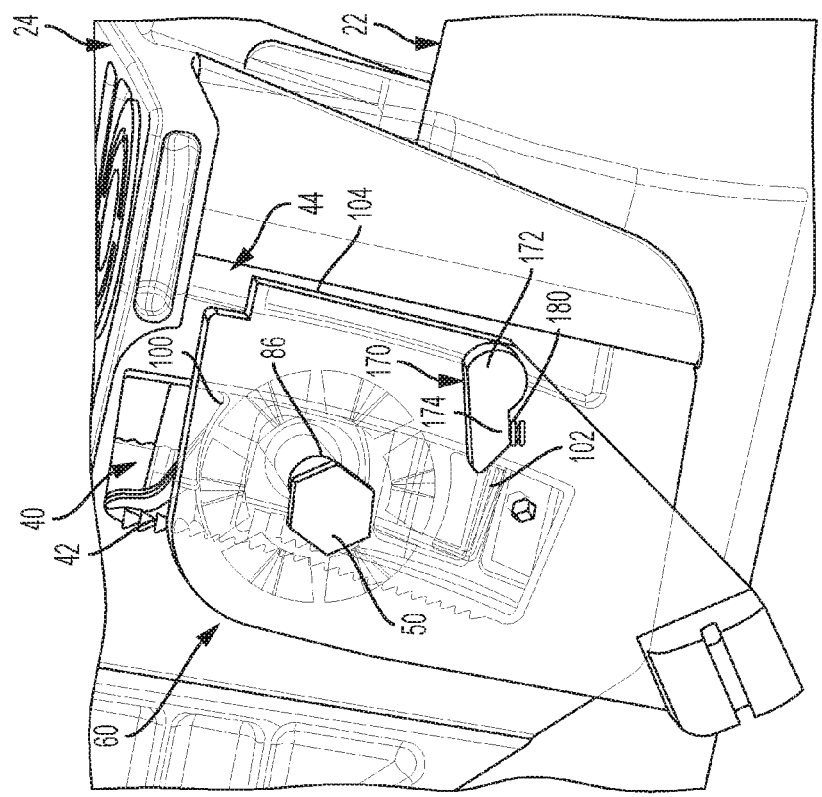
FIG. 6 is a partial perspective view of the first cam member of the locking assembly connected to a support bracket of the steering column assembly.
Figure 5:
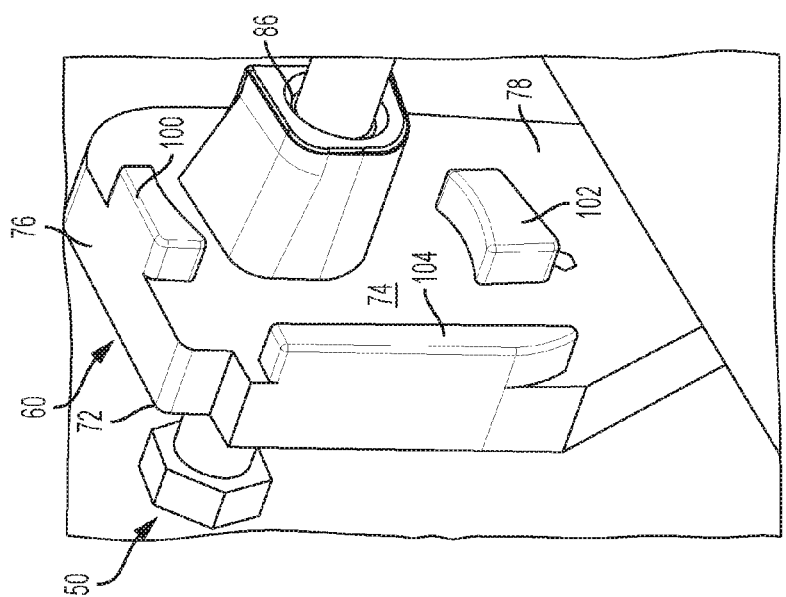
FIG. 5 is a rear perspective view of a first cam member of the locking assembly.

Referring to FIGS. 1 and 6, the support bracket 24 is attached to a vehicle structure, such as an instrument panel. The support bracket 24 at least partially receives the jacket assembly 22. The support bracket 24 defines a support bracket opening 40, a plurality of rake teeth 42, and a rake slot 44. The support bracket opening 40 extends from an external surface of the support bracket 24 towards an internal surface of the support bracket 24 disposed proximate the jacket assembly 22.

The rake slot 44 extends from the external surface of the support bracket 24 towards the internal surface of the support bracket 24. The rake slot 44 may not extend completely through the support bracket 24. The rake slot 44 is spaced apart from the support bracket opening 40.

Referring FIGS. 1-6, the locking assembly 26 is connected to the support bracket 24. The locking assembly 26 is connected to the support bracket 24 by a clamp bolt 50. The locking assembly 26 is movable between a lock position and an unlock position. The lock position of the locking assembly 26 is a position in which the locking assembly 26 applies tension or a clamping load to the clamp bolt 50 to inhibit adjustment or movement of the steering wheel connected to the jacket assembly 22 of the steering column assembly 10. The unlock position of the locking assembly 26 is a position in which the locking assembly 26 does not apply tension or a clamping load to the rake bolt to permit adjustment of the steering wheel connected to the jacket assembly 22 of the steering column assembly 10.

The locking assembly 26 is configured as a cam clamp mechanism that operates in a continuous direction. The cam clamp mechanism may be configured as a ratchet mechanism that is reset between actuations to selectively lock and unlock the locking assembly 26. During operation, a first actuation of the locking assembly 26 may unlock the locking assembly 26 and a second actuation the locking assembly 26 subsequent to the first actuation of the locking assembly 26 may lock the locking assembly 26, or vice versa. The locking assembly 26 includes a first cam member 60, a second cam member 62, a lever 64, and a first biasing member 66.

The first cam member 60 is connected to the support bracket 24. The first cam member 60 is fixedly positioned relative to the second cam member 62. The first cam member 60 includes a first cam member body 70 extending between a first cam member first face 72, a first cam member second face 74, a first cam member first end 76, and a first cam member second end 78.

The first cam member first face 72 is substantially planar and is disposed opposite the first cam member second face 74. The first cam member first face 72 defines a first locking pattern 80. The first locking pattern 80 is configured as a plurality of protrusions that extend from the first cam member first face 72. The first locking pattern 80 includes at least a first locking member 82 and a second locking member 84 disposed adjacent to the first locking member 82. The first locking pattern 80 is configured as an arcuate pattern that is disposed about a first opening 86 that extends from the first cam member first face 72 to the first cam member second face 74.

Each locking member of the first locking pattern 80 includes a first surface 90, a second surface 92, and a first tip 94 extending between the first surface 90 and the second surface 92. The first surface 90 extends from the first cam member first face 72 towards the first tip 94. The second surface 92 extends from the first cam member first face 72 towards the first tip 94. The first surface 90 and the second surface 92 are disposed at an oblique angle with respect to each other. The first surface 90 and the second surface 92 are separated from each other by the first tip 94. The first tip 94 may be configured as a substantially planar surface, a generally arcuate surface, a pointed surface, or the like.

The first locking member 82 and the second locking member 84 are positioned relative to each other to define a first valley 96 between the first locking member 82 and the second locking member 84. The first valley 96 may be defined by the second surface 92 of the first locking member 82 and the first surface 90 of the second locking member 84 disposed adjacent to the first locking member 82.

The first cam member second face 74 is disposed opposite the first cam member first face 72. The first cam member second face 74 is disposed proximate the external surface of the support bracket 24. In at least one embodiment, this first cam member second face 74 engages the external surface of the support bracket 24. The first cam member second face 74 is disposed substantially parallel to the first cam member first face 72. The first cam member second face 74 defines a first guidepost 100, a second guidepost 102, and an inner protrusion 104.

The first guidepost 100 is disposed proximate the first cam member first end 76. The first guidepost 100 extends from the first cam member second face 74 towards the support bracket 24. The first guidepost 100 is at least partially received within the support bracket opening 40.

The second guidepost 102 is disposed proximate the first cam member second end 78. The second guidepost 102 is disposed opposite the first guidepost 100. The second guidepost 102 extends from the first cam member second face 74 towards the support bracket 24. The second guidepost 102 is at least partially received within the support bracket opening 40. The first guidepost 100 and the second guidepost 102 are configured to help guide the first cam member 60 of the locking assembly 26 during a rake or pivot adjustment of the steering wheel connected to the jacket assembly 22 of the steering column assembly 10.

The inner protrusion 104 is spaced apart from the first guidepost 100 and the second guidepost 102. The inner protrusion 104 is disposed proximate an edge of the first cam member second face 74. The inner protrusion 104 is at least partially received within the rake slot 44. The inner protrusion 104 and the rake slot 44 are configured to inhibit rotation of the first cam member 60 of the locking assembly 26.

The second cam member 62 is spaced apart from the support bracket 24. The second cam member 62 is rotatable relative to the first cam member 60. The second cam member 62 includes a second cam member body 110 that extends between a second cam member first end 112 and a second cam member second end 114.

The second cam member body 110 defines a plurality of teeth 120. The plurality of teeth 120 extend about the second cam member body 110. The plurality of teeth 120 are disposed between the second cam member first end 112 and the second cam member second end 114. In at least one embodiment, the plurality of teeth 120 are disposed proximate the second cam member first end 112.

The second cam member first end 112 defines a stop member 122. The stop member 122 is configured as a planar disc having a diameter greater than the second cam member body diameter. In at least one embodiment, the stop member 122 may be integral with the second cam member body 110.

The second cam member second end 114 is disposed proximate the first cam member first face 72. The second cam member second end 114 defines a second locking pattern 124. The second locking pattern 124 faces towards the first locking pattern 80. The second locking pattern 124 is configured to selectively engage the first locking pattern 80.

The second locking pattern 124 is configured as a plurality of protrusions that extend from second cam member second end 114. The second locking pattern 124 includes at least a third locking member 130 and a fourth locking member 1 disposed adjacent to the third locking member 130. The second locking pattern 124 is configured in an arcuate pattern that is disposed about a second opening 134 that extends from the second cam member first end 112 to the second cam member second end 114.

Each locking member of the second locking pattern 124 includes a third surface 140, a fourth surface 142, and a second tip 144 extending between the third surface 140 and the fourth surface 142. The third surface 140 extends from the second cam member second end 114 towards the second tip 144. The fourth surface 142 extends from the second cam member second end 114 towards the second tip 144. The third surface 140 and the fourth surface 142 are disposed at an oblique angle with respect to each other. The third surface 140 and the fourth surface 142 are separated from each other by the second tip 144. The second tip 144 may be configured as a substantially planar surface, a generally arcuate surface, a pointed surface, or the like.

The third locking member 130 and the fourth locking member 1 are positioned relative to each other to define a second valley 146 between the third locking member 130 and the fourth locking member 1. The second valley 146 may be defined by the fourth surface 142 of the third locking member 130 and the third surface 140 of the fourth locking member 1 disposed adjacent to the third locking member 130.

Referring to FIG. 3, while the locking assembly 26 is in the unlock position the first valley 96 is rotationally offset from the second valley 146. The rotational offset between the first valley 96 and the second valley 146 results in the first tip 94 of the first locking member 82 being received within the second valley 146 such that the first locking member 82 is disposed between the third locking member 130 and the fourth locking member 1. The rotational offset between the first valley 96 and the second valley 146 results in the first tip 94 of the second locking member 84 being received within the first valley 96 such that the second locking member 84 is disposed between the third locking member 130 and the fourth locking member 1. The rotational offset between the first valley 96 and the second valley 146 results in at least one of the first cam member 60 and the second cam member 62 of the locking assembly 26 not applying tension or a clamp load to the clamp bolt 50 permitting adjustment of the steering wheel to connect to the jacket assembly 22 of the steering column assembly 10.

Referring to FIG. 4, while the locking assembly 26 is in the lock position the first valley 96 is proximately aligned and/or is not rotationally offset from the second valley 146. The proximate alignment between the first valley 96 and the second valley 146 results in the first tip 94 of the first locking member 82 being disposed on or engaging the second tip 144 of the third locking member 130 such that the first locking member 82 is in opposing engagement with the third locking member 130. The proximate alignment between the first valley 96 and the second valley 146 results in the first tip 94 of the second locking member 84 being disposed on or engaging the second tip 144 of the fourth locking member 1 such that the second locking member 84 is in opposing engagement with the fourth locking member 1. The proximate alignment between the first valley 96 and the second valley 146 results in at least one of the first cam member 60 and the second cam member 62 of the locking assembly 26 applying tension or a clamp load to the clamp bolt 50 to inhibit adjustment of the steering wheel connected to the jacket assembly 22 of the steering column assembly 10.

The lever 64 is connected to the second cam member 62. The lever 64 is movable between a first position and a second position to rotate the second cam member 62 to move the locking assembly 26 between the unlock position and the lock position. In at least one embodiment, the first position of the lever 64 corresponds to the lock position of the locking assembly 26 and the second position of the lever 64 corresponds to the unlock position of locking assembly 26. The lever 64 may be moved between the first position and the second position by direct actuation of the lever 64 by the driver or by a separate actuation/user lever that is attached to the lever 64 through a cable mechanism, a linkage mechanism, a gear mechanism, or the like.

The lever 64 includes a lever body 150 that extends between a first lever face 152 and a second lever face 154. The first lever face 152 is disposed adjacent to the stop member 122 of the second cam member 62. The second lever face 154 is disposed opposite the first lever face 152. The second lever face 154 faces towards the first cam member first face 72 of the first cam member 60. The lever body 150 defines a lever opening 160, a first recess 162, and a second recess 164.

The lever opening 160 extends from the first lever face 152 to the second lever face 154. The clamp bolt 50 extends through the first opening 86, the second opening 134, and at least one embodiment the lever opening 160. The lever opening 160 at least partially receives the second cam member 62. The lever opening 160 is sized such that the lever 64 is disposed about the second cam member body 110.

The first recess 162 extends from the first lever face 152 towards the second lever face 154. The first recess 162 includes an arcuate pocket portion 166. The second recess 164 is disposed adjacent to the first recess 162. The second recess 164 is disposed between the lever opening 160 and the arcuate pocket portion 166 of the first recess 162.

The first recess 162 is configured to receive a pawl 170. The pawl 170 includes a first pawl portion 172 and a second pawl portion 174. The first pawl portion 172 is provided with a complementary arcuate shape and is at least partially received within the arcuate pocket portion 166 of the first recess 162. The second pawl portion 174 extends from the first pawl portion 172. The second pawl portion 174 is configured to selectively engage a tooth of the plurality of teeth 120 of the second cam member body 110 to inhibit rotation of the second cam member 62 relative to the lever body 150 as the locking assembly 26 moves away or towards the lock position.

The second recess 164 is configured to receive a second biasing member 180. The second biasing member 180 is configured to engage a surface of the second recess 164 and the first pawl portion 172 of the pawl 170. The second biasing member 180 is configured to bias the pawl 170 towards engagement with a tooth of the plurality of teeth 120 of the second cam member body 110.

The pawl 170 is configured to compress the second biasing member 180 in response to the lever 64 being moved between the first position and the second position. The compression of the second biasing member 180 and the movement of the lever 64 between the first position the second position rotates the second cam member 62 relative to the first cam member 60 to move the locking assembly 26 between the lock position and the unlock position.

The first biasing member 66 is disposed between the first cam member 60 and lever 64. The first biasing member 66 is disposed about the second cam member body 110. An end of the first biasing member 66 is configured to engage a portion of the lever 64. The first biasing member 66 is configured as an indexing spring that biases the lever 64 towards the first position when the lever 64 is moved between the first position and the second position.

Figure 8:
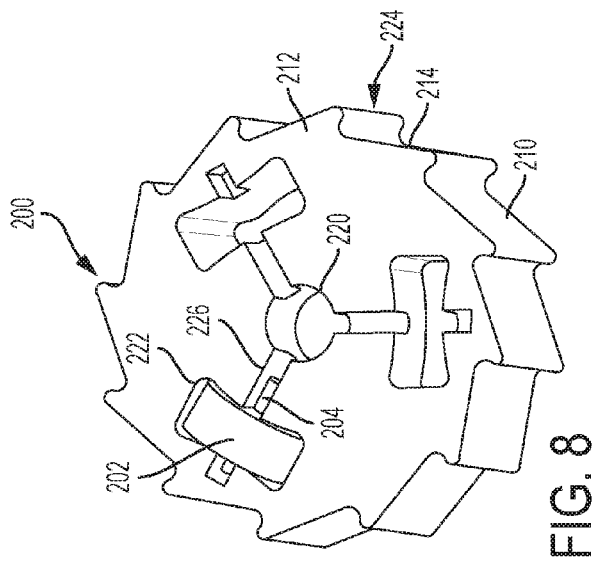
FIG. 8 is a perspective view of a second cam member of the locking assembly.
Figure 9:
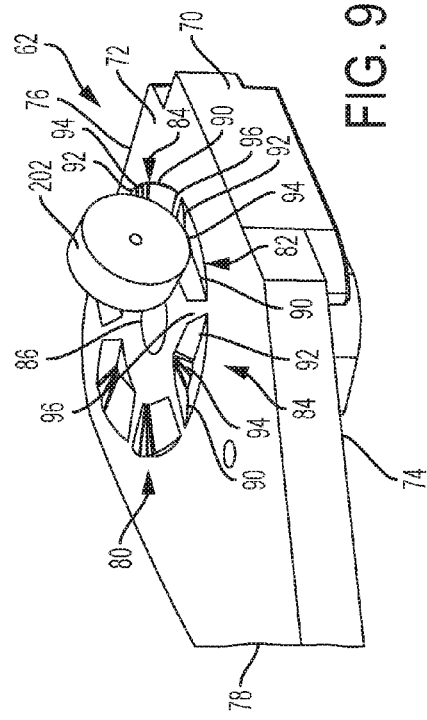
FIG. 9 is a perspective view of a rolling element disposed on protrusion of first cam member of the locking assembly.
Figure 7:
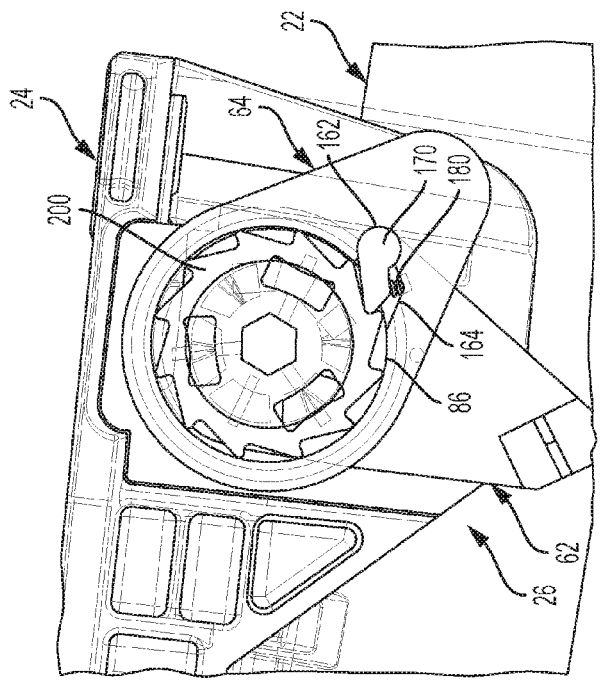
FIG. 7 is a perspective view of a locking assembly of the steering column assembly.

Referring to FIGS. 7-9, the second cam member 62 of the locking assembly 16 may be replaced with an alternate second cam member 200 and at least one rolling element 202 supported by an axle 204. In at least one embodiment, a stop member may be integrated into the rolling element 202. In another embodiment, the stop member may be a separate component from the second cam member 200 or the rolling element 202 and is configured as a rolling interface for the rolling element 202 without use of the axle 204. This configuration enables the use of a spherical ball bearing as the rolling element 202.

The second cam member 200 is rotatable relative to the first cam member 60. The second cam member 200 includes a second cam member body 210 that extends between a second cam member first face 212 and a second cam member second face 214. The second cam member first face 212 faces towards the first locking pattern 80 disposed on the first cam member first face 72 of the first cam member 60.

The second cam member body 210 defines a central opening 220, at least one rolling element pocket 222, and a plurality of teeth 224. The central opening 220 extends from the second cam member first face 212 towards the second cam member second face 214. In at least one embodiment, the central opening 220 extends completely through the second cam member body 210. In such an embodiment, the clamp bolt 50 extends through the central opening 220.

The rolling element pocket 222 extends from the second cam member first face 212 towards the second cam member second face 214. In at least one embodiment, the rolling element pocket 222 extends completely through the second cam member body 210. The rolling element pocket 222 is spaced apart from the central opening 220.

The plurality of teeth 224 extend about the second cam member body 210. The plurality of teeth 224 extend between the second cam member first face 212 and the second cam member second face 214. The pawl 170 selectively engages a tooth of the plurality of teeth 224 to inhibit rotation of the second cam member 200.

In at least one embodiment, an elongate groove 226 extends between the central opening 220 and the rolling element pocket 222. The elongate groove 226 is defined by the second cam member body 210. The elongate groove 226 extends from the second cam member first face 212 towards the second cam member second face 214.

The rolling element 202 is received within the rolling element pocket 222. The rolling element 202 is configured to ride along the first locking pattern 80 as the second cam member 200 rotates relative to the first cam member 60 as the lever 64 moves between the first position and the second position to move the locking assembly 26 between the lock position and the unlock position.

While the locking assembly 26 is in the lock position, the rolling element 202 is disposed on the first tip 94 of one of the first locking member 82 and the second locking member 84 of the first locking pattern 80 of the first cam member 60. The disposing of the rolling element 202 on the first tip 94 of one of the first locking member 82 and the second locking member 84 results in at least one of the first cam member 60 and the second cam member 200 of the locking assembly 26 applying tension or a clamp load to the clamp bolt 50 to inhibit adjustment of the steering wheel connected to the jacket assembly 22 of the steering column assembly 10.

While the locking assembly 26 is moved from the lock position towards the unlock position by the action of moving the lever 64 between the first position and the second position to rotate the second cam member 200 relative to the first cam member 60, the rolling element 202 rides along the first surface 90 or the second surface 92 of at least one of the first locking member 82 and the second locking member 84 towards the first valley 96.

While the locking assembly is in the unlock position, the rolling element 202 is at least partially received within the first valley 96. The at least partial receiving of the rolling element 202 within the first valley 96 results in at least one of the first cam member 60 and the second cam member 200 of the locking assembly 26 not applying tension or a clamp load to the clamp bolt 50 to permit adjustment of the steering wheel connected to the jacket assembly 22 of the steering column assembly 10.

Throughout this specification, the term "attach," "attachment," "connected", "coupled," "coupling," "mount," or "mounting" shall be interpreted to mean that a structural component or element is in some manner connected to or contacts another element, either directly or indirectly through at least one intervening structural element, or is integrally formed with the other structural element.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the scope of the present disclosure. Additionally, while various embodiments of the present disclosure have been described, it is to be understood that aspects of the present disclosure may include only some of the described embodiments or combinations of the described embodiments. Accordingly, the present disclosure is not to be seen as limited by the foregoing description.

Having thus described the present disclosure, it is claimed:

1. A steering column assembly, comprising:
   a jacket assembly connected to a support bracket; and
   a locking assembly, movable between a lock position and an unlock position, comprising:
      a first cam member connected to the support bracket, the first cam member having a first locking pattern;
      a second cam member rotatable relative to the first cam member, the second cam member having a second cam member body extending between a second cam member body first end and a second cam member body second end, the second cam member body second end defining a second locking pattern configured to selectively engage the first locking pattern; and
      a lever disposed about the second cam member body, movable between a first position and a second position.

2. The steering column assembly of claim 1, wherein a plurality of teeth are disposed about the second cam member body.

3. The steering column assembly of claim 2, wherein the locking assembly further comprising a first biasing member disposed about the second cam member body and engages the lever to bias the lever towards the first position.

4. The steering column assembly of claim 3, wherein the first locking pattern includes a first locking member and a second locking member disposed adjacent to the first locking member, each of the first locking member and the second locking member having a tip.

5. The steering column assembly of claim 4, wherein the second locking pattern includes a third locking member and a fourth locking member disposed adjacent to the third locking member, each of the third locking member and the fourth locking member having a tip.

6. The steering column assembly of claim 5, wherein while the locking assembly is in the lock position, at least one of the tip of the first locking member and the second locking member engages at least one of the tip of the third locking member and the fourth locking member.

7. The steering column assembly of claim 6, wherein while the locking assembly is in the unlock position, at least one of the first locking member and the second locking member is disposed between the third locking member and the fourth locking member.

8. The steering column assembly of claim 7, wherein the lever defines a first recess that receives a pawl that selectively engages the plurality of teeth to inhibit rotation of the second cam member.

9. The steering column assembly of claim 8, wherein the lever defines a second recess disposed adjacent to the first recess that receives a second biasing member.

10. The steering column assembly of claim 9, wherein in response to the lever being moved between the first position and the second position, the pawl compresses the second biasing member and the second cam member rotates relative to the first cam member to move the locking assembly between the lock position and the unlock position.

11. A steering column assembly, comprising:
- a locking assembly, movable between a lock position and an unlock position, comprising:
  - a first cam member connected to a support bracket, the first cam member having a first locking pattern;
  - a second cam member rotatable relative to the first cam member, the second cam member having a second cam member body extending between a first face and a second face, the first face faces towards the first locking pattern of the first cam member, the second cam member body defining a pocket extending from the first face towards the second face;
  - a rolling element received within the pocket, the rolling element configured to ride along the first locking pattern; and
  - a lever defining an opening that at least partially receives the second cam member, the lever being movable between a first position and a second position.

12. The steering column assembly of claim 11, wherein the second cam member body defines a plurality of teeth.

13. The steering column assembly of claim 12, wherein the first locking pattern includes a first locking member and a second locking member disposed adjacent to the first locking member.

14. The steering column assembly of claim 13, wherein the first locking member and the second locking member are positioned to define a valley disposed between the first locking member and the second locking member.

15. The steering column assembly of claim 14, wherein while the locking assembly is in the lock position, the rolling element is disposed on a tip of at least one of the first locking member and the second locking member.

16. The steering column assembly of claim 15, wherein while the locking assembly is in the unlock position, the rolling element is at least partially received within the valley.

17. The steering column assembly of claim 16, wherein the lever defines a first recess disposed adjacent to the opening, the first recess receives a pawl that selectively engages a tooth of the plurality of teeth to inhibit rotation of the second cam member.

18. The steering column assembly of claim 17, wherein the lever defines a second recess disposed between the first recess and the opening that receives a second biasing member.

19. The steering column assembly of claim 18, wherein in response to the lever being moved between the first position and the second position, the pawl compresses the second biasing member and the second cam member rotates relative to the first cam member to move the locking assembly between the lock position and the unlock position.

20. The steering column assembly of claim 18, wherein the second biasing member biases the pawl towards engagement with the tooth of the plurality of teeth.

\* \* \* \* \*